(No Model.)
J. LEPINE, Jr., & P. H. ROELANTS.
Device for Ornamenting Skins.
No. 239,809. Patented April 5, 1881.
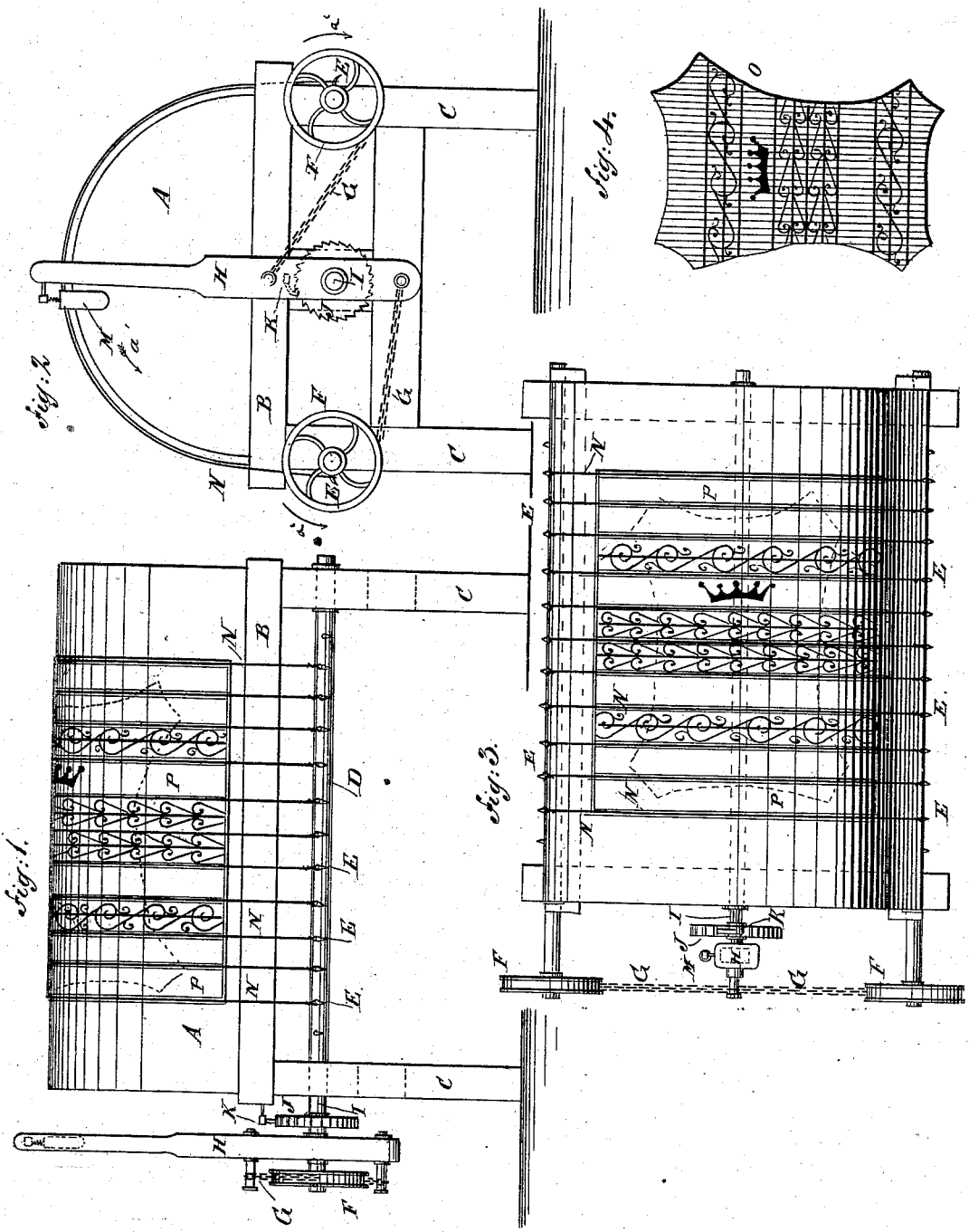
WITNESSES:
Chas. Nida
C. Sedgwick
INVENTOR:
J. Lepine Jr
P. H. Roelants
BY Munn & Co
ATTORNEYS.

UNITED STATES PATENT OFFICE.

JOSEPH LÉPINE, FILS, AND PIERRE H. ROELANTS, OF BRUSSELS, BELGIUM.

DEVICE FOR ORNAMENTING SKINS.

SPECIFICATION forming part of Letters Patent No. 239,809, dated April 5, 1881.

Application filed February 19, 1881. (No model.)

*To all whom it may concern:*

Be it known that we, JOSEPH LÉPINE, Jr., and PIERRE HENRI ROELANTS, of Brussels, Belgium, have invented a new and Improved Device for Ornamenting Skins, of which the following is a specification.

The object of our invention is to provide an apparatus for holding skins and hides, whereby the application of coloring-matter in ornamenting the skins is greatly facilitated.

The invention consists of a table, preferably having a cylindrical shape, on which the skin to be colored and ornamented is placed, and each side of the table is provided with a rotary shaft, a series of wires extending from one shaft to the other over the surface of the table, the two shafts being operated, by means of a central lever, in such a manner as to draw or press all the wires simultaneously upon the surface of the table.

In using our invention the skin to be ornamented is laid out upon the surface of the table, and the stencil-plates by which the ornamentation is produced are placed upon the surface of the skin underneath the wires.

In the accompanying drawings, Figure 1 is a side elevation of our improved device for holding skins to be dyed. Fig. 2 is an end elevation of the same. Fig. 3 is a plan view. Fig. 4 is a representation of a colored and ornamented skin.

Similar letters of reference indicate corresponding parts.

A semi-cylindrical box, A, made of wood or metal and covered with cloth, is supported by the frame B, with suitable legs C C. A shaft, D, is journaled longitudinally at the two long sides of the frame B, and both of these shafts D are provided with a series of curved prongs or hooks, E, spaced about at equal distances throughout the length of the shaft. A grooved wheel, F, is mounted on one end of each shaft D, and a chain, G, is attached to each of these grooved wheels F, and the other ends of these chains are attached to a lever, H, pivoted to the end of the box A, the chains being attached to the lever equidistant from the pivot I, as shown. A ratchet-wheel, J, is mounted on the pivot I, and a pawl, K, engages with the teeth of this wheel. The chains G pass from the lower part of the wheels F to the lever H, so that both shafts D will turn from the inside toward the outside of the frame if the lever H is moved in the direction of the arrow $a'$.

M is a weight attached to the upper end of the lever H, and has the tendency to draw the lever in the direction mentioned.

Wires or equivalents N, with a loop at each end, pass transversely over the semi-cylindrical box A, and are hooked on the curved prongs E of the shafts D, as shown. Only one shaft D may be used, the other ends of the wires N N being firmly attached to the frame B, or the lower edge of the top of the table.

The operation is as follows: The skin or hide O is placed upon the cloth-covered semi-cylinder A with the side to be colored facing upward, and the stencil-plate P, provided with the ornaments desired on the skin or hide, is placed over the latter, and then the ends of the wires N are hooked on the curved prongs E, these wires having previously been passed over the top of the stencil-plate P. If the lever H is now turned in the direction of the arrow $a'$, the wheels F and shafts D will rotate, as indicated, and the wires N N will be drawn taut, thus pressing the stencil-plate upon the skin. The lever H is locked in this position by means of the pawl K, which engages with any one of the teeth of the ratchet-wheel J. The skin and the stencil will lie smoothly upon the semi-cylindrical box, and if the color is now applied with a brush, or in any other suitable manner, it can only color the leather at such places where the stencil-plate is cut out, which is desired. The ground of the skin is generally dyed before the pattern or ornament. If a dark ground and a light pattern are required, then the latter is dyed first and the ground later, the pattern being protected by a metallic plate, which covers it and is held over it by the wires N N. When the coloring is completed the lever H is released, the wires N are unhooked, and the stencil-plate and the skin are removed.

Having thus described our invention, we claim as new and desire to secure by Letters Patent—

1. An apparatus for ornamenting skins and other substances consisting of the following elements: a table having a suitably-formed surface, and a series of wires, simultaneously operated by means of a shaft to press and hold the skin and stencil-plate upon the surface of the table, all constructed and arranged substantially as herein shown and described, and for the purpose set forth.

2. In a device for holding a skin or hide to be ornamented, the combination, with the semi-cylindrical table A, of the wires N, the shafts D, the wheels F, the chains G, or equivalents, and the lever H, substantially as herein shown and described, and for the purpose set forth.

JOSEPH LÉPINE, FILS.
PIERRE HENRI ROELANTS.

Witnesses:
L. SPEDDING,
C. VAN CAUMENBERG.